(12) United States Patent
Francescutto et al.

(10) Patent No.: US 9,917,439 B2
(45) Date of Patent: Mar. 13, 2018

(54) RENEWABLE ENERGY UNIT WITH SIMPLIFIED CONNECTION

(71) Applicant: Belenos Clean Power Holding AG, Bienne (CH)

(72) Inventors: Gianni Francescutto, Bienne (CH); Antoine Toth, Delemont (CH); Alexandre Closset, Ferreyres (CH)

(73) Assignee: Belenos Clean Power Holding AG, Bienne (CH)

( * ) Notice: Subject to any disclaimer, the term of this patent is extended or adjusted under 35 U.S.C. 154(b) by 464 days.

(21) Appl. No.: 14/385,057

(22) PCT Filed: Mar. 13, 2013

(86) PCT No.: PCT/EP2013/055161
§ 371 (c)(1),
(2) Date: Sep. 12, 2014

(87) PCT Pub. No.: WO2013/135777
PCT Pub. Date: Sep. 19, 2013

(65) Prior Publication Data
US 2015/0028679 A1    Jan. 29, 2015

(30) Foreign Application Priority Data
Mar. 14, 2012    (EP) .................................... 12159515

(51) Int. Cl.
*H02J 1/00*    (2006.01)
*H02J 1/10*    (2006.01)
(Continued)

(52) U.S. Cl.
CPC ................ *H02J 1/102* (2013.01); *H02J 1/14* (2013.01); *H02J 3/383* (2013.01); *H02J 3/385* (2013.01);
(Continued)

(58) Field of Classification Search
CPC .......... H02J 1/102; H02J 1/14; H02J 2001/106
(Continued)

(56) References Cited

U.S. PATENT DOCUMENTS

2008/0111517 A1* 5/2008 Pfeifer .................. H02J 7/0065
                                                              320/101
2009/0160258 A1    6/2009 Allen et al.
(Continued)

FOREIGN PATENT DOCUMENTS

WO        2013135777 A2    9/2013

OTHER PUBLICATIONS

U.S. Appl. No. 61/553,513 (for Jergovic et al US 2013/0106194 A1), filed Oct. 31, 2011, pp. 1-38.*
(Continued)

*Primary Examiner* — Alfonso Perez Borroto
(74) *Attorney, Agent, or Firm* — Oblon, McClelland, Maier & Neustadt, L.L.P.

(57) ABSTRACT

The present invention relates to an electronic device comprising a power supply module connected to a converter system, wherein said power supply module comprises a plurality of elements for producing electricity from renewable energy connected in series and said elements for producing electricity from renewable energy are assembled in groups, characterized in that the converter system comprises a plurality of regulator circuits, each regulator circuit being connected to a group of elements for producing electricity from renewable energy so that each group of elements for producing electricity from renewable energy can be controlled separately.

7 Claims, 3 Drawing Sheets

(51) Int. Cl.
*H02J 3/38* (2006.01)
*H02J 1/14* (2006.01)

(52) U.S. Cl.
CPC ......... *H02J 2001/106* (2013.01); *Y02B 10/14* (2013.01); *Y02E 10/563* (2013.01); *Y02E 10/58* (2013.01); *Y02E 10/725* (2013.01); *Y02P 80/23* (2015.11); *Y10T 307/609* (2015.04)

(58) Field of Classification Search
USPC .......................................................... 307/63
See application file for complete search history.

(56) References Cited

U.S. PATENT DOCUMENTS

| 2009/0284232 | A1* | 11/2009 | Zhang | G05F 1/67 |
| | | | | 322/89 |
| 2010/0133911 | A1 | 6/2010 | Williams et al. | |
| 2011/0204720 | A1* | 8/2011 | Ruiz | B60L 11/1816 |
| | | | | 307/66 |
| 2013/0106194 | A1* | 5/2013 | Jergovic | H01L 31/0504 |
| | | | | 307/77 |

OTHER PUBLICATIONS

International Search Report issued in corresponding application PCT/EP2013/055161, completed Jan. 22, 2014, dated Jan. 29, 2014.

\* cited by examiner

RENEWABLE ENERGY UNIT WITH SIMPLIFIED CONNECTION

This is a National Phase Application in the U.S. of International Patent Application PCT/EP2013/055161 filed Mar. 13, 2013, which claims priority on European Patent Application No. 12159515.1 of Mar. 14, 2012. The entire disclosures of the above patent applications are hereby incorporated by reference.

The present invention relates to an electronic device comprising a power supply module connected to a converter system, wherein said power supply module comprises a plurality of elements for producing electricity from renewable energy connected in series and said elements for producing electricity from renewable energy are assembled in groups.

TECHNOLOGICAL BACKGROUND

Solar systems installed in dwellings or public and commercial buildings are known. These solar systems are generally composed of a plurality of solar units 1 shown in FIG. 1, wherein each unit comprises a solar panel 2 connected to a converter system 11. All the converter systems are connected to a distributor system, which is responsible for sending the electricity produced to the public electricity network or to the electricity network of the dwellings or public or commercial building. This distributor allows the electricity produced by the solar panels to be sold or used to reduce dependence on the public electricity network.

Each solar panel comprises a plurality of photovoltaic cells 3, each comprising a positive terminal and a negative terminal. These photovoltaic cells are connected in series, each solar panel thus comprising a first cell and a last cell. These photovoltaic cells are assembled in the form of groups 4 of the same number of photovoltaic cells. For example, a solar panel comprising twelve photovoltaic cells consists of three groups of four photovoltaic cells. In general, the photovoltaic cells are arrayed in rows and columns and each row of photovoltaic cells forms a group.

Each solar panel also comprises a plurality of protective diodes 5 connected in series, wherein each protective diode is connected in parallel to one of the groups 4. It is thus understood that the negative terminal of the first photovoltaic cell of the group is connected to the anode of the diode and the positive terminal of the last photovoltaic cell of the group is connected to the cathode of the diode. This arrangement allows the photovoltaic cells to be protected by preventing the current of one group of photovoltaic cells from passing to the photovoltaic cells of another group.

The positive terminal of the first photovoltaic cell and the negative terminal of the last photovoltaic cell are connected to the converter system 11. The latter comprises a regulator unit 6 comprising a plurality of regulator circuits 7, which are arranged in parallel and are controlled in modulation so that a single regulator circuit 7 is active at a given instant. The signals supplied by the regulator circuits are sent to a DC/AC converter 8 responsible for transforming a continuous voltage into an alternating current at output Sout.

A disadvantage of this system results from the use of protective diodes, also referred to as bypass diodes. In fact, these diodes are components that consume power and lead to a reduction in the efficiency of the solar system. Efficiency is a very important feature nowadays if it is intended that this energy source should eventually be able to replace current fossil fuels.

These diodes also have the disadvantage of being fragile and expensive, which demands caution. It is thus understood that these diodes must be welded by hand because the use of an automated process would risk significant breakage and therefore incur an equally significant cost.

SUMMARY OF THE INVENTION

The aim of the present invention is to set aside the disadvantages by providing an electronic device with a power supply module that is simpler to configure, less costly and that guarantees protection of the power supply module in association with an improved efficiency.

For this, the invention relates to an electronic device comprising a power supply module connected to a converter system, wherein said power supply module comprises a plurality of elements for producing electricity from renewable energy connected in series and said elements for producing electricity from renewable energy are assembled in groups characterised in that the converter system comprises a plurality of regulator circuits, wherein each regulator circuit is connected to a group of elements for producing electricity from renewable energy so that each group of elements for producing electricity from renewable energy can be controlled separately.

In a first advantageous embodiment the converter system additionally comprises a microcontroller for controlling the regulator circuits by pulse width modulation.

In a second advantageous embodiment the regulator circuits enable tracking of the maximum power point of the elements for producing electricity from renewable energy.

In a third advantageous embodiment in that each group comprises an identical number of elements for producing electricity from renewable energy.

In another advantageous embodiment the elements for producing electricity from renewable energy are photovoltaic cells.

In another advantageous embodiment the elements for producing electricity from renewable energy are wind turbines.

In another advantageous embodiment the elements for producing electricity from renewable energy are hydroelectric turbines.

The advantage of this device is that each group of photovoltaic cells is controlled independently. This thus allows each group to be regulated individually.

Moreover, this configuration allows the connection of the solar panels to be simplified, since these no longer include integrated diodes. In fact, since each regulator circuit is directly connected to the terminals of a group of photovoltaic cells, the current cannot pass from one group to another. Protective diodes that block the current and prevent it from passing from one group to another are therefore not necessary. The production costs are therefore reduced and the production process is simplified because the solar panels no longer include any component apart from the photovoltaic cells.

BRIEF DESCRIPTION OF THE FIGURES

The aims, advantages and features of the present invention will become clearer from the following detailed description of an exemplary embodiment of the electronic device according to the invention, wherein this embodiment is only given purely for non-restrictive, illustrative purposes in association with the attached drawing.

DETAILED DESCRIPTION

Figure 1:
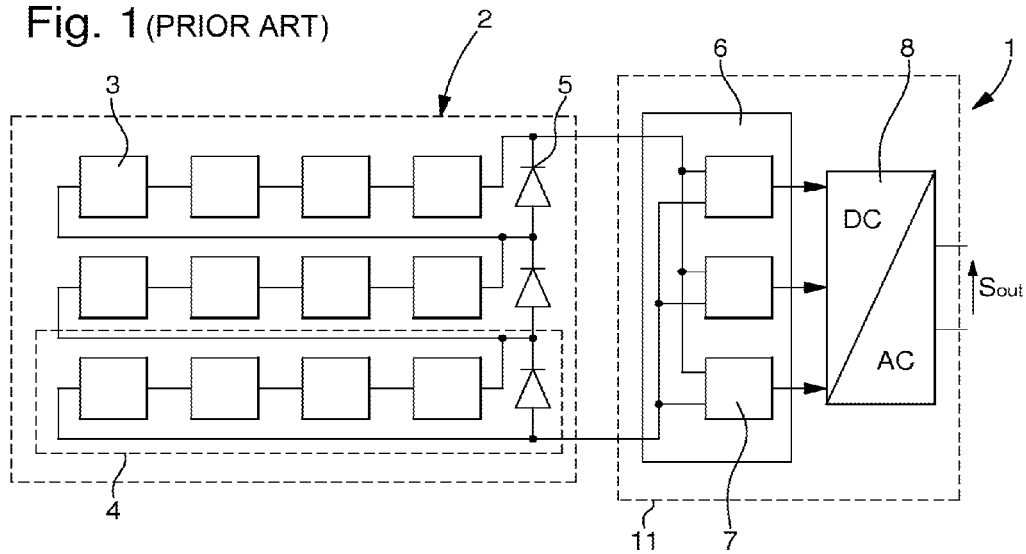
FIG. 1 shows a power supply unit according to the prior art.
Figure 2:
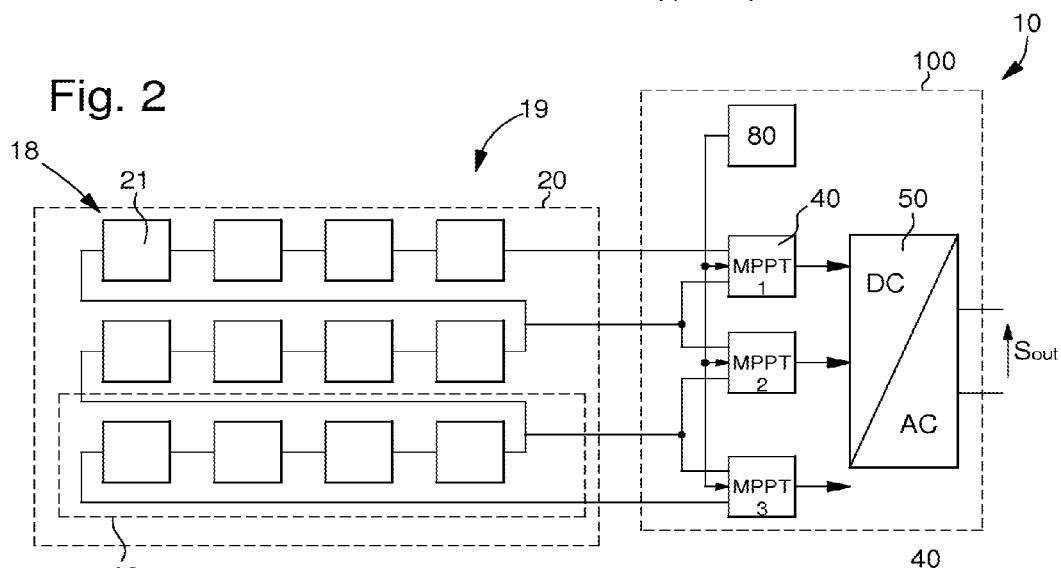
FIG. 2 shows a power supply unit according to the invention.

FIG. 2 shows an electronic device such as a power supply unit 10 according to the invention. This power supply unit 10 comprises a power supply module 19 connected to a converter system 100. This power supply module 19 consists of a plurality of elements 18 for producing electricity such as, for example, elements for producing electricity from renewable energy. For example, the power supply module 19 is a solar module 20 or solar panel. The solar panel 20 comprises a plurality of photovoltaic cells 21. Each photovoltaic cell 21 comprises a positive terminal and a negative terminal. The photovoltaic cells 21 are connected in series. It will be understood that the solar module 20 of the power supply unit 10 can, of course, be replaced by a wind turbine module comprising wind turbines or mini-wind turbines connected in series or by a hydroelectric module comprising hydroelectric turbines or mini-turbines connected in series. Furthermore, the solar module 20 of the power supply unit 10 can be replaced by an electrochemical module comprising electrochemical cells connected in series.

These photovoltaic cells 21 are assembled in groups 22 so that each group 22 is formed by at least one photovoltaic cell 21 or preferably by multiple adjacent photovoltaic cells 21. Each group 22 of photovoltaic cells thus comprises a positive terminal and a negative terminal. It will be understood that the positive terminal of the first photovoltaic cell 21 of the group is the positive terminal of the group and that the negative terminal of the last photovoltaic cell 21 of the group is the negative terminal of the group. The groups 22 of photovoltaic cells can preferably consist of an identical or different number of photovoltaic cells 21.

Figure 3:
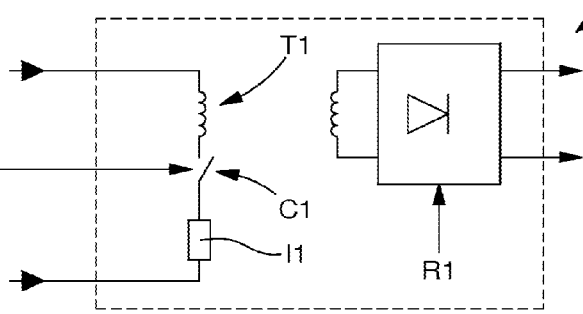
FIG. 3 shows a regulator circuit according to the invention.

The converter system 100 comprises a plurality of regulator circuits 40 connected in parallel. Each regulator circuit 40, shown in FIG. 3, comprises a transformer T1 in series with switching elements C1. Each regulator circuit 40 additionally comprises a current measuring element 11 arranged in series with the switching elements C1. The transformer T1, switching elements C1 and the current measuring element 11 are arranged in parallel with the photovoltaic cells 21. Each regulator circuit 40 also comprises a rectifier R1 connected to the output of the transformer T1 to supply an intermediate voltage. It is therefore understood that each regulator circuit 40 has its own rectifier R1.

Each regulator circuit 40 is preferably an MPPT (maximum power point tracking) regulator, i.e. a regulator circuit 40 that allows tracking of the maximum power point of a non-linear electric generator. In fact, a photovoltaic generator is a generator in which the characteristic of the current as a function of the voltage is highly non-linear. Consequently, for the same illumination, the power delivered will be different according to the load. An MPPT regulator circuit 40 thus enables the static inverter connecting the load (a battery, for example) and the photovoltaic panel, i.e. the solar module 20, to be controlled in order to continuously supply the maximum power to the load.

The power supply unit 10 additionally comprises a microcontroller 80 that controls the regulator circuits 40 by means of a time-shifted control. In other words, the regulator circuits 40 are controlled by pulse width modulation and are switched successively in a determined time window. To achieve this, the microcontroller 80 sends a signal to the switching elements C1 of each regulator circuit 40.

Advantageously, according to the invention each group 22 of photovoltaic cells 21 is directly connected by its positive and negative terminals to a regulator circuit 40 so that the groups of photovoltaic cells 21 are arranged in parallel to one another. This arrangement enables the different groups 22 to become independent. Moreover, this independence of the groups 22 from to one another allows each group 22 of photovoltaic cells 21 to be protected. In fact, by having groups of photovoltaic cells 22 that are independent of one another, i.e. each group being connected to a regulator circuit, the current can be prevented from spreading from one group into another group. In actual fact, in the event of a problem on a photovoltaic cell 21, a current anomaly appears and the regulator circuits 40 will tend to try to minimise this anomaly. This anomaly will tend to then spread to other cells 21. In contrast, in the case of groups 22 of photovoltaic cells 21 that are independent of one another a current anomaly will spread to other cells 21 of the groups of photovoltaic cells, but not into the other groups of photovoltaic cells.

Each group 22 of photovoltaic cells 21 is therefore individually controlled and optimisation is also achieved individually for each group 22. In fact, since each group 22 has its own regulator circuit 40, each regulator acts independently. As a result of this, if one of the photovoltaic cells 21 of a group drops in efficiency, the regulator circuit 40 of the group will correct it.

Figure 7A:
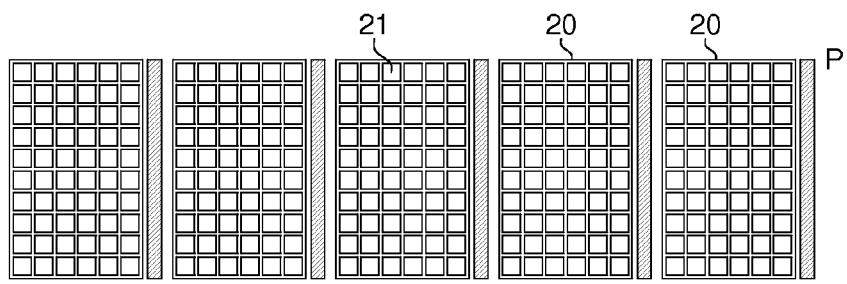
FIGS. 7A, 7B and 7C show different phases of operation of the power supply unit according to the invention.

Moreover, this individual control of the groups 22 of photovoltaic cells 21 means less impact on the power supply modules 19. In actual fact, with this type of installation, the control by the regulator circuits 40 is conducted so that all the photovoltaic cells 21 are supplied by the same current. FIG. 7A shows that without shade on the plurality of solar modules 20 consisting of a plurality of photovoltaic cells 21, it is evident that each module 20 delivers a power P.

Figure 7B:
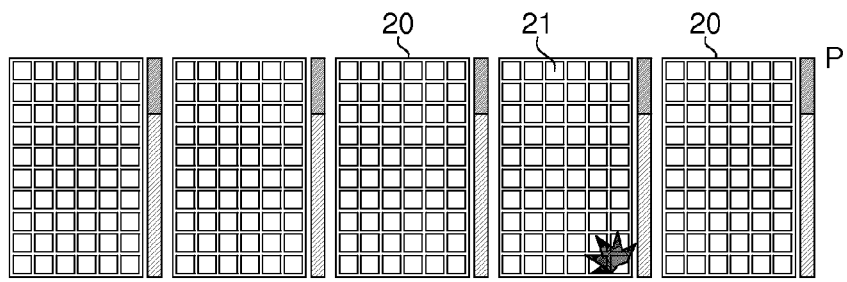

Consequently, if the photovoltaic cells 21 are not in groups, the decrease in current of a photovoltaic cell 21 resulting from shade then causes a decrease in current in all the photovoltaic cells 21, as is evident in FIG. 7B.

Figure 7C:
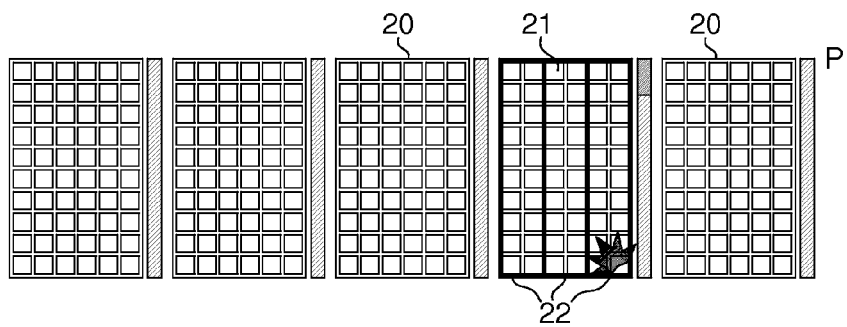

With the configuration of the invention in which the photovoltaic cells 21 are assembled in groups 22 of photovoltaic cells, each controlled by a regulator circuit, the presence of shade at the level of a photovoltaic cell 21 of a group 22 of photovoltaic cells will only affect said group 22 and not the others. As a result, the other groups 22 of photovoltaic cells continue to function at their maximum capacity, as evident in FIG. 7C.

Figure 4:
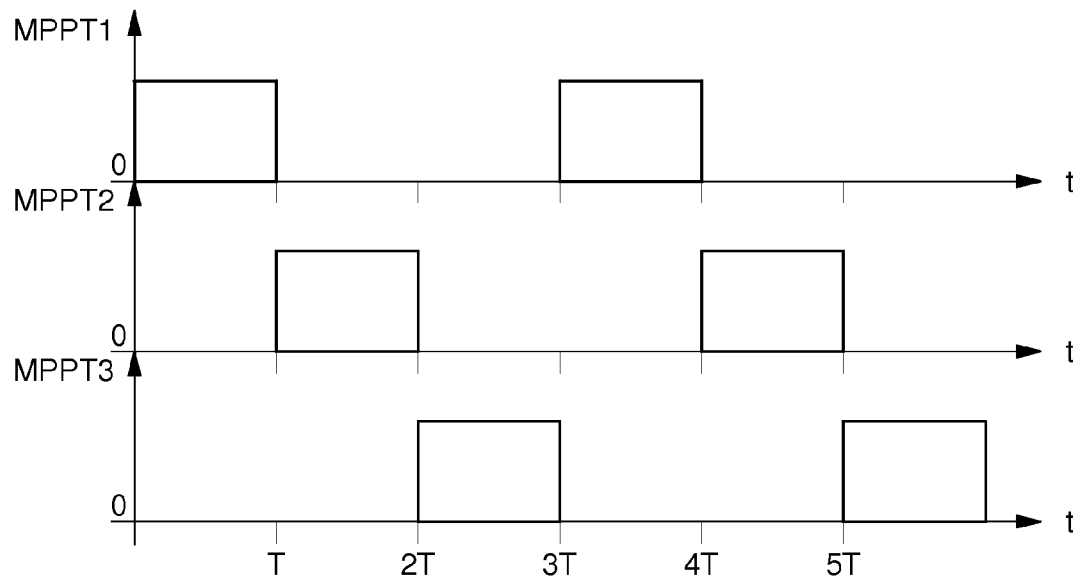
FIGS. 4 to 6 are each circuit diagrams of the regulators of the power supply unit according to the invention.
Figure 5:
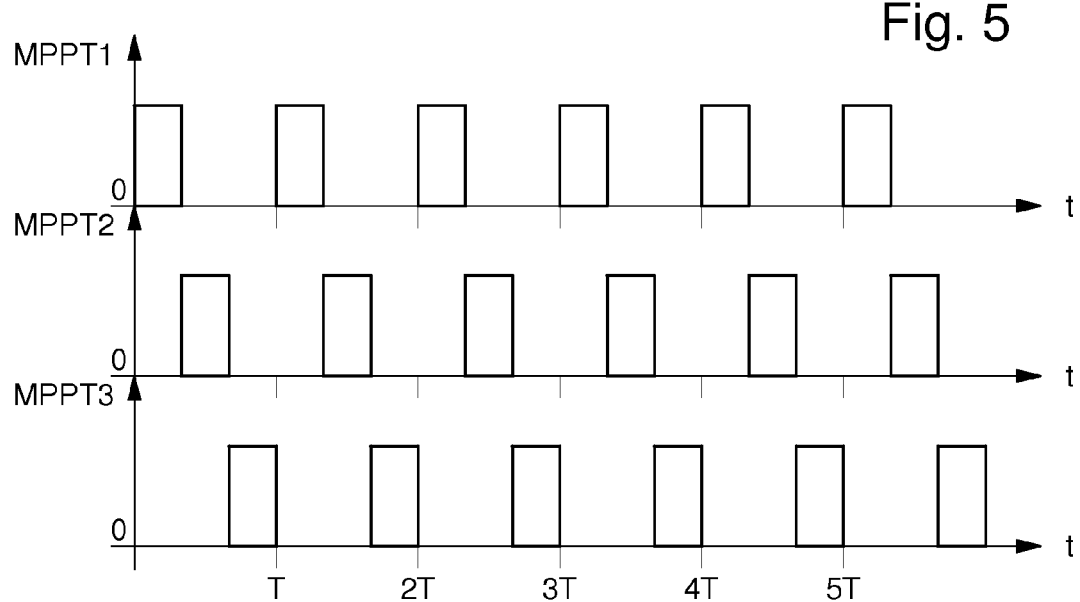
Figure 6:
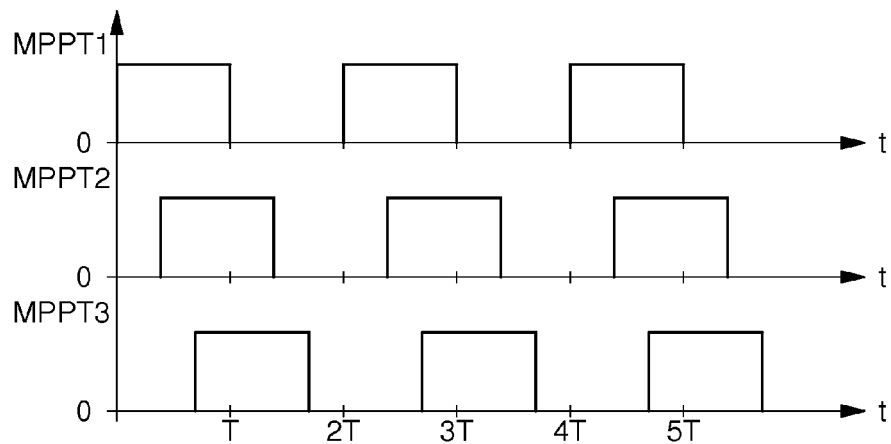

A pulse width modulation control, as shown in FIGS. 4 to 6, is used for the control of these regulator circuits 40. This control consists of acting on the switching elements C1 of each regulator circuit 40 MPPT1, MPPT2 and MPPT3 so that these regulator circuits 40 are more or less conductive. The control is sent to the regulator circuits 40 so that a single regulator circuit 40 is conductive at a given instant.

For this, it is conceivable that the control of the regulator circuits 40 is phase shifted. In fact, by phase shifting the control signals of the regulator circuits 40, it is possible to adapt the operation of the power supply unit 40 as a function of the required power output from the power supply unit 10. Thus, in the case of low power, the signal shift control is configured so that a regulator circuit is activated in each time period. This means that each regulator circuit 40 is activated once every three periods, as evident from FIG. 4.

For higher power rates required, it can be provided that the regulator circuits 40 are activated in the same period but phase shifted, as is evident in FIGS. 5 and 6. This configuration allows the regulator circuits 40 to be switched so as to allow more current, and therefore a higher power, to pass through. This therefore means that all the regulator circuits are activated in every period so that a single regulator circuit 40 is active at a given instant, as evident in FIG. 5.

In the present case shown in FIG. 2 with 3 groups of photovoltaic cells with a high power required, the shift is a third of a period i.e. T/3 so that at instant t=0 the first regulator circuit 40 MPPT1 activates with a pulse width ranging from 0 to T/3. At t=T/3 the second regulator circuit 40 MPPT2 activates with a pulse width ranging from T/3 to 4T/3. At t=2T/3 the third regulator circuit 40 MPPT3 activates with a pulse width ranging from 2T/3 to 5T/3, as evident in FIG. 6. The activations overlap.

This manner of controlling the regulator circuits 40 MPPT1, MPPT2 and MPPT3 enables the operating frequency to be virtually increased. In fact, instead of there being one activation of the regulator circuits 40 MPPT1, MPPT2 and MPPT3 per period, there are three activations per period, as evident in FIG. 5. More particularly, it is components such as bypass capacitors that see an increase in activation frequency of the regulator circuits 40.

Capacitors have an impedance that is dependent on the frequency. Consequently, if the frequency increases, it is possible to reduce the value of the capacitor while retaining the same impedance. Moreover, since the size and costs of a capacitor are linked to its farad value, a decrease thereof results in a reduction in size and price of the bypass capacitors without reducing their efficiency.

The signals supplied by regulator circuits are sent to a DC/AC converter stage 50, i.e. a stage that converts the continuous voltage supplied by the regulator circuits 40 MPPT into an alternating current that is compatible with the network. The voltage supplied at output Sout of this DC/AC converter stage 50 is, for example, an alternating voltage of 110 to 230 VAC and a frequency of 50 to 60 Hz.

It will be understood that various modifications and/or improvements and/or combinations that are evident to a person skilled in the art can be applied to the different embodiments of the invention outlined above without departing from the framework of the invention as defined by the attached claims.

The invention claimed is:

1. An electronic device comprising a power supply system connected to a converter system,
    the power supply system comprising a plurality of elements configured to produce electricity from a renewable energy source, the plurality of elements being connected in series to form a string of elements, nodes between predetermined elements in the string of elements defining a plurality of groups of elements in the string of elements; and
    the converter system comprising a plurality of regulator circuits, each regulator circuit of the plurality of regulator circuits being connected to nodes that define a respective group of the plurality of groups of elements in the string of elements, and being connected in parallel to the respective group, said each regulator circuit being configured to control the respective group separately from another group of the plurality of groups of elements in the string of elements that is connected in parallel to another regulator circuit of the plurality of regulator circuits.

2. The electronic device according to claim 1, wherein the converter system further comprises a microcontroller configured to control the plurality of regulator circuits by pulse width modulation.

3. The electronic device according to claim 2, wherein the plurality of regulator circuits are further configured to track a maximum power point of the plurality of elements.

4. The electronic device according to claim 1, wherein each group of the plurality of groups of elements in the string of elements comprises a same number of elements of the plurality of elements.

5. The electronic device according to claim 1, wherein the elements of the string of elements are photovoltaic cells.

6. The electronic device according to claim 1, wherein the elements of the string of elements are wind turbines.

7. The electronic device according to claim 1, wherein the elements of the string of elements are hydroelectric turbines.

* * * * *